US007847976B2

(12) United States Patent
Schweid et al.

(10) Patent No.: US 7,847,976 B2
(45) Date of Patent: Dec. 7, 2010

(54) IMAGE OUTPUT COLOR MANAGEMENT SYSTEM AND METHOD

(75) Inventors: Stuart Alan Schweid, Pittsford, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 559 days.

(21) Appl. No.: 11/961,492

(22) Filed: Dec. 20, 2007

(65) Prior Publication Data

US 2009/0161127 A1  Jun. 25, 2009

(51) Int. Cl.
G03F 3/08 (2006.01)
H04N 1/46 (2006.01)

(52) U.S. Cl. .................. 358/1.9; 358/504; 358/518; 358/523; 358/3.23

(58) Field of Classification Search .......... 358/1.9, 358/3.23, 504, 518, 523; 382/162, 167
See application file for complete search history.

(56) References Cited

U.S. PATENT DOCUMENTS

| | | | |
|---|---|---|---|
| 5,543,940 A * | 8/1996 | Sherman ............... 358/518 |
| 6,278,533 B1 * | 8/2001 | Takemoto ............. 358/523 |
| 6,625,303 B1 | 9/2003 | Young et al. |
| 6,847,376 B2 | 1/2005 | Engeldrum et al. |
| 6,963,668 B2 | 11/2005 | Engeldrum et al. |
| 7,034,848 B2 | 4/2006 | Sobol |
| 7,177,466 B1 | 2/2007 | Bernard et al. |
| 7,221,786 B2 | 5/2007 | Luo et al. |
| 2003/0053085 A1 * | 3/2003 | Takemoto ............... 358/1.9 |
| 2005/0111017 A1 * | 5/2005 | Takahashi et al. ......... 358/1.9 |
| 2009/0141322 A1 * | 6/2009 | Tin ..................... 358/535 |

OTHER PUBLICATIONS

Raja Bala, "Digital Color Imaging Handbook," Chapter 5: Device Characterization; Xerox Imaging & Services Technology Center, Webster, NY 14580.
Lalit K. Mestha et al., "Low Cost LED Based Spectrophotometer," Wilson Center for Research and Technology, Xerox Corporation, Webster, NY USA.
U.S. Appl. No. 11/789,091, filed Apr. 23, 2007, Mestha et al.
U.S. Appl. No. 11/890,888, filed Aug. 8, 2007, Wang et al.
U.S. Appl. No. 11/636,841, filed Dec. 11, 2006, Wang et al.
U.S. Appl. No. 11/636,747, filed Dec. 11, 2006, Mestha et al.

* cited by examiner

Primary Examiner—Kimberly A Williams
(74) Attorney, Agent, or Firm—Fay Sharpe LLP

(57) ABSTRACT

Disclosed is an image output device color management system. The color management system includes a 2 dimensional principle component analysis (PCA) compensation method for reducing the number of measurement required for re-profiling a device, such as a printer.

20 Claims, 5 Drawing Sheets

IMAGE OUTPUT COLOR MANAGEMENT SYSTEM AND METHOD

BACKGROUND

This disclosure relates to color image output systems. Specifically, this disclosure relates to a system and method of controlling an image output device to produce a consistent spectrum of colors and color separations.

To meet customer demands, image output devices such as a printer or display need to produce a consistent spectrum of colors over time. For example, customers want a printing system to produce a particular colored document consistently from day to day, or print job to print job.

To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. For example, a Pantone® color spectrum may be utilized as a color target reference and the LUTs produced by the characterization and calibration process are device dependent CMYK color space representations of the Pantone® target colors. This characterization and calibration process is generally referred to as profiling a device or printer.

To accomplish the profiling of a printing device, a spectrophotometer or other image sensing device is used to measure the calorimetric properties of the produced images. These measured colorimetric properties provide an objective basis of comparison to the reference target color set and provide the necessary feedback to iteratively generate accurate device dependent LUTs.

Notably, the device profiling method discussed above can also be applied to a display where an image sensing device is approximately located to the display for calorimetric measurements of the displayed image. In addition, multiple LUTs may be generated for an image output device to account for multiple media types and/or half tone screens.

Printer correction and characterization/profiling require a large data set of patches to be printed and measured. This is required because a four color printer is a 4 dimensional system since it spans the CMYK color space. The measuring of such a large number of patches makes using this method of calibration difficult to use for more frequent updates in the field. Until now, calibration has been limited to 4 1-D TRCs since the full characterization/profiling is too large a problem to solve in the field. The multiple 1D TRCs cannot provide an effective correction for all regions of the color space as a full correction LUT using the printer model.

INCORPORATION BY REFERENCE

The following documents are totally incorporated herein by reference.

U.S. patent application filed Apr. 23, 2007, by Mestha et al., Ser. No. 11/789,091, entitled: "IMAGE OUTPUT COLOR MANAGEMENT SYSTEM AND METHOD."

U.S. patent application filed Aug. 8, 2007, by Wang et al., Ser. No. 11/890,888, entitled: "IMAGE OUTPUT COLOR MANAGEMENT SYSTEM AND METHOD."

U.S. patent application filed Dec. 11, 2006, by Wang et al., Ser. No. 11/636,841, entitled: "OPTIMAL TEST PATCH SELECTION FOR MULTI-MEDIA PRINTING SYSTEMS USING LOW RANK APPROXIMATION."

U.S. patent application filed Dec. 11, 2006, by Mestha et al., Ser. No. 11/636,747, entitled: "METHOD AND SYSTEM FOR IDENTIFYING OPTIMAL MEDIA FOR CALIBRATION AND CONTROL."

"DIGITAL COLOR IMAGING HANDBOOK," Chapter 5: Device Characterization; by Raja Bala, Xerox Imaging & Services Technology Center, Webster, N.Y. 14580.

"LOW COST LED BASED SPECTROPHOTOMETER," by Lalit K. Mestha et al., Wilson Center for Research and Technology, Xerox Corporation, Webster, N.Y. USA.

BRIEF DESCRIPTION

In one aspect of this disclosure, a method for controlling an image output device is disclosed. The method for controlling the image output device comprises (a) generating an initial image output device LUT (look-up-table) characterizing the image output device for a plurality of states associated with the image output device, wherein each state of the image output device LUT associates a first set of target colors with a plurality of respective spectral measurements; (b) generating a first data matrix representing all spectral measurements associated with each respective target color for all image output device states; (c) calculating the nominal spectral response associated with each target color; (d) generating a second data matrix representing the target color spectral variation by subtracting the nominal spectral response from each target color spectral response for each state; (e) performing a first PCA (Principle Component Analysis) on the second data matrix to represent the image output device LUT with a third data matrix including the first set of target colors associated with a predetermined number of spectral directions; (f) performing a second PCA on each spectral direction associated with the third data matrix to represent the image output device LUT with a fourth data matrix including each principle spectral direction associated with the variation of the first set of target colors; (g) measuring the spectral properties associated with a second set of target colors, the second set of target colors including a subset first set of target colors; and (h) estimating an image output device LUT for the first set of target colors utilizing the third and fourth data matrixes, and the measured spectral properties associated with the second set of target colors.

In another aspect of this disclosure, an image output device color control system is disclosed. The image output device color control system comprises an image output device comprising an input configured to receive image data for display or printing by the image output device; a spectral measurement device; and a controller operatively connected to the image output device and spectral measurement device, the controller configured to receive CMYK or RGB data and convert to image output device independent image input data and map the device independent input data to image output device dependent input data for display or printing by the image output device, wherein the controller comprises a controller-usable data carrier storing instructions that, when executed by the controller cause the controller to perform a method comprising (a) generating an initial image output device LUT (look-up-table) characterizing the image output device for a plurality of states associated with the image output device, wherein each state of the image output device LUT associates a first set of target colors with a plurality of respective spectral measurements; (b) generating a first data matrix representing all spectral measurements associated with each respective target color for all image output device states; (c) calculating the nominal spectral response associated with each target color; (d) generating a second data matrix representing the target color spectral variation by subtracting the nominal spectral response from each target color spectral response for each state; (e) performing a first PCA (Principle Component Analysis) on the second data matrix to represent the image output device LUT with a third data matrix including the first set of target colors associated with a predetermined number of spectral directions; (f) performing a second PCA on each spectral direction associated with the third data matrix to represent the image output device LUT with a fourth data matrix including each principle spectral direction associated with the variation of the first set of target colors; (g) measuring the spectral properties associated with a second set of target colors, the second set of target colors including a subset first set of target colors; and (h) estimating an image output device LUT for the first set of target colors utilizing the third and fourth data matrixes, and the measured spectral properties associated with the second set of target colors.

In still another aspect of this disclosure, a xerographic imaging system is disclosed. The xerographic imaging system comprises an image marking device; an in-line spectral measurement device operatively connected to the image marking device; and a controller operatively connected to the image marking device and spectral measurement device the controller configured to receive CMYK or RGB data and convert to image output device independent image input data and map the device independent input data to image output device dependent input data for display or printing by the image output device, wherein the controller comprises a controller-usable data carrier storing instructions that, when executed by the controller cause the controller to perform a method comprising: (a) generating an initial image output device profile LUT (look-up-table) characterizing the color profile of the image output device for a plurality of states associated with the image output device, wherein each state of the image output device LUT associates a first set of target colors with a plurality of respective spectral measurements; (b) generating a first data matrix representing all spectral measurements associated with each respective target color for all image output device states; (c) calculating the nominal spectral response associated with each target color; (d) generating a second data matrix representing the target color spectral variation by subtracting the nominal spectral response from each target color spectral response for each state; (e) performing a first PCA (Principle Component Analysis) on the second data matrix to represent the image output device profile LUT with a third data matrix including the first set of target colors associated with a predetermined number of spectral directions; (f) performing a second PCA on each spectral direction associated with the third data matrix to represent the image output device profile LUT with a fourth data matrix including each principle spectral direction associated with the variation of the first set of target colors; (g) measuring the spectral properties associated with a second set of target colors, the second set of target colors including a subset first set of target colors; and (h) estimating an image device output profile LUT for the first set of target colors utilizing the third and fourth data matrixes, and the measured spectral properties associated with the second set of target colors.

DETAILED DESCRIPTION

Figure 1:
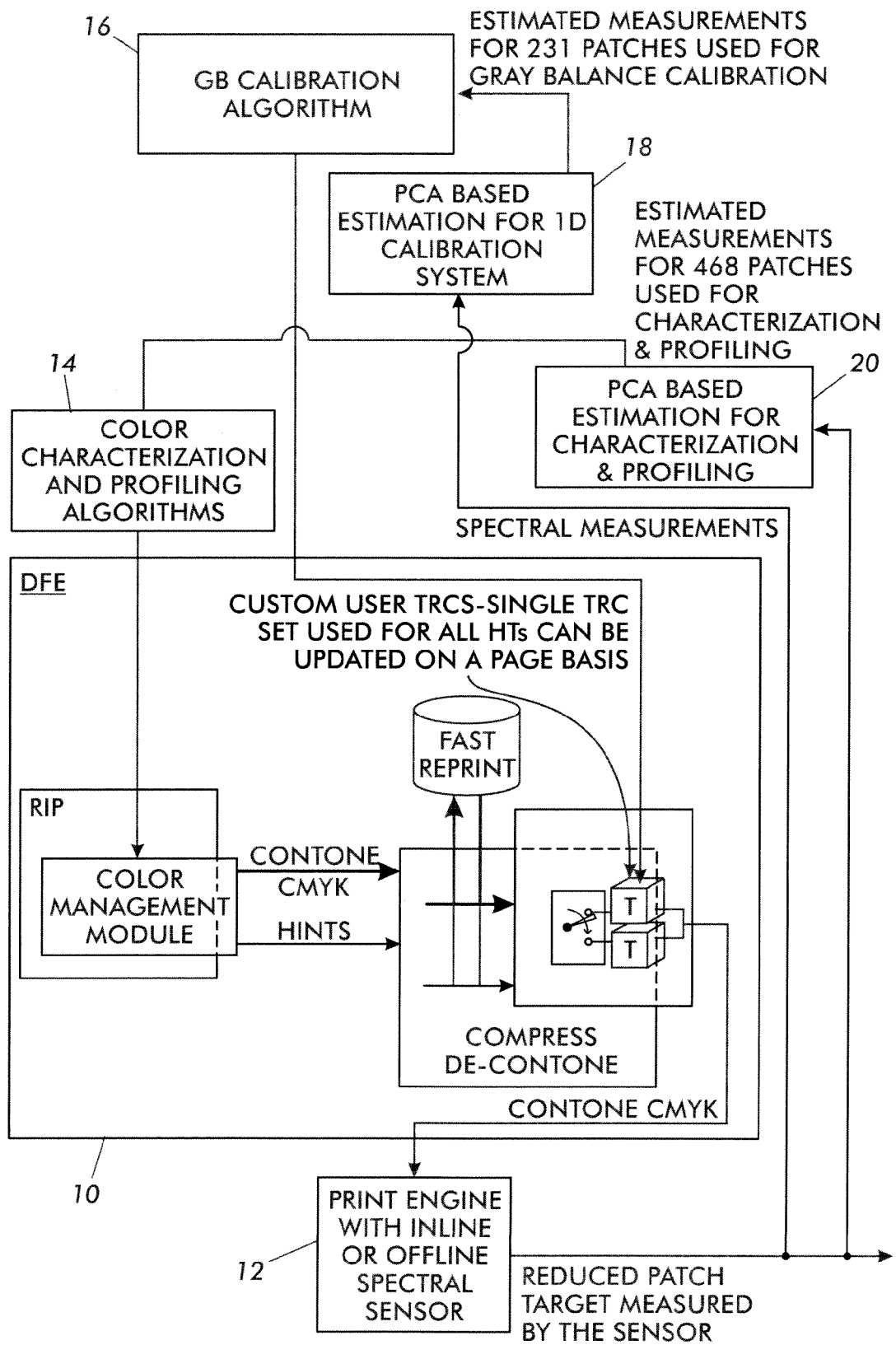
FIG. 1 illustrates an exemplary printing system according to this disclosure.

This disclosure provides a method and system that uses 2D principal component analysis (PCA) to significantly reduce the required number of measurements needed to characterize an image output device, such as a printer. According to one exemplary embodiment, a large amount of data is collected a priori to model the printer using several spectral and patch relationship eigenvectors. The measurements required to obtain the printer model is then estimated using these eigenvectors and a small subset of patch measurements. The coefficients of these eigenvectors are estimated using relatively few patches (e.g. 33 from 468) that can be printed on 3 pages for inline measurement with the ILS, making it a viable fast in-field method of profiling. The 2D PCA allows the spectral relationships to be combined into an orthogonal set so that the second PCA can be applied independently to each spectral component, hence the name 2D separable PCA. The 2D separable approach gives additional computational benefits over prior art methods particularly when the number of patches used while constructing basis vectors are large. A multiple 1-D PCA approach could not be used on the original (non-PCA) spectral data or any other color space (e.g. xyz), as there is no guarantee that these components are orthogonal for the given patch set. The disclosed method is also applicable to reduce the required number of patches for constructing 1D TRCs (e.g., from 231 down to 11).

Currently, in some color printing systems, printer characterization and profiling is performed using 468 distinct color patches. These patches are distributed in the color space and are assumed to adequately depict the printer response. A printer model is created from the patch data and the model can be used to approximate the printer response for any input CMYK. The model can also be used to generate a profile for the printer. The profile essentially inverts the printer model; it determines the CMYK needed to generate a desired color.

The printer model, while effective, requires a considerable amount of data. For example, it may require the measurement of 468 patches, where each patch is comprised of 31 spectral response measurements. It has been suggested that Principal Component Analysis (PCA) is one technique to reduce the amount of data needed to adequately model the printer. (See Mestha et al., U.S. patent application Ser. No. 11/789,091 and Wang et al., U.S. patent application Ser. No. 11/890,888.) PCA, alternately referred to as the Karhunen-Loève transform or the Hotelling transform, is a technique applied to vector data, whereas the patch measurements data is a matrix containing data. These U.S. patent applications disclose methods to compress the LUT using PCA methodology, which then results in the reduction of measurements/media etc., for in-field updates. (See also Wang et al., U.S. patent application Ser. No. 11/636,841 and Mestha et al., U.S. patent application Ser. No. 11/636,747). The PCA method described in this disclosure uses 2D separable PCA vectors.

One technique for applying PCA to matrix data is to "vectorize" the matrix data; the matrix is converted to a vector by appending each column of the matrix to a single vector stream. This results in a vector that is 14500 long. An alternate approach is to solve this as two separable PCA problems. The first PCA problem considers only the spectral variation, thereby reducing the 31 spectral components to a much smaller subset. The second PCA considers patch variation to determine the relationship between the 468 patches for each of the spectral components.

With reference to FIG. 1, illustrated is an integrated view of the PCA based updates with an existing DFE (Digital Front End) color control system. The PCA based updates are used to provide updates for 1D or multi-dimensional profile LUTs.

The DFE color control system includes a DFE 10, a color print engine 12, a 1D PCA based estimation process 18, a GB (Gray Balance) calibration algorithm process 16, and a color characterization process 14. In addition, the print engine 12 includes an inline or off-line spectral sensor.

To provide a 2D separable PCA process for reducing measurements of patch targets, a PCA based estimation process 20 is operatively connected to the color characterization 14 process.

According to this exemplary color control system, the color characterization process 14 uses profiling algorithms to generate multi-dimensional LUTs. See "Digital Color Imaging Handbook," chapter 5. The GB calibration algorithm process 16 uses Automated Color Calibration, DTP41 (Offline Spectrophotometer) or ILS (Inline Spectrophotometer) based calibration generates gray balance calibration TRCs to using 234 or so patch measurements. These algorithms convert data from the spectrophotometer into adjusted tone reproduction curves, which standardizes the color settings in the printer.

The following discussion provides the details of the operation of the PCA based estimation for characterization and profiling process 20.

The data set available to determine the PCA vectors consists of N sets of patch data. Standard spectral sensors, e.g., Gretag spectrophotometer which outputs 36 spectral reflectance values, evenly spaced at 10 nm over the visible spectrum over the spectrum 380 nm to 730 nm, or an XRite 938 spectrophotometer or an inline spectrophotometer, which has 31 outputs evenly spaced at 10 nm over the spectrum of 400 nm to 700 nm, can be used for measurement. Again, each set of data contains a 31 component spectral response when 31 outputs are available for each of 468 patches. The embodiments disclosed herein, use 31 outputs, however, other embodiments within the breadth of this disclosure can use more or less outputs.

To do a PCA, for every patch the mean (or nominal) response of the patch is subtracted from the actual response to get a spectral variation response. For example, for each of the N samples of patch #38, the nominal response of patch #38 is subtracted. When done for all 468 colors, a data set of 468*N spectral responses is generated.

PCA is performed on this huge data set to determine if there are significant spectral directions in the patch data. If a matrix, D (size (468×N)×31), is created where each row is an observation of spectral variation (each row is the variation of the 31 spectral components from the nominal for that patch color), then the PCA is just the eigenvalues and eigenvectors of $$D^T D/(468*N) \quad (1)$$

i.e. $\lambda$=31 eigenvalues of $D^T D/(468*N)$, $\lambda_i$—the $i^{th}$ largest eigenvalue of $D^T D$ $\beta$=31 eigenvectors (31 long) of $D^T D/(468*N)$, $\beta_i$—eigenvector or principal component associated with $\lambda_i$ On a set of N=25 cells, or 25 different machine states (which can be easily obtained by changing xerographic setpoints, printing 468 patches during each setpoint state and measuring the spectral output for each patch) or the data set on 25 different machines with each machine operating at its nominal state, the PCA analysis shows that there are three strong spectral directions that account for 98% of the energy variation of the data. It is therefore possible to reduce our 468×31 data set to a 468×3 data set with very little loss of information. The fact that the multiple cell machine state data set is large (>10000) and that there are few principal directions gives great confidence in the validity of the data.

To find the 468×3 ($D_3$) data from the 468×31 data set (D) we use $$D_3 = D \beta_r \quad (2)$$

Where $\beta_r = [\beta_1 \ \beta_2 \ \beta_3]$ (31×3)

The PCA allows us to reconstruct the estimate of the original 468×31 ($D_{estimate}$) from the 468×3 ($D_3$) using the same principal components, and compare to the original D (size (468×N)×31) to see how well the low rank approximation holds good. i.e.

$$D_{estimate} = D_3 \beta_r^T \quad (3)$$

Additionally, the PCA method assures that the principal directions determined by the spectral PCA stage are orthogonal to each other, allowing the second PCA analysis (patch correlations) to be done on each of the three components (or columns of $D_3$) independently. On each of the 3 principal spectral directions a PCA is performed. This second PCA (hence the name '2D separable PCA') allows the variation in the 468 patches to be represented using only a few coefficients and eigenvectors.

If instead of performing a spectral PCA, a known space was used (e.g. L*a*b* or xyz), it could not be assumed that the three directions are orthogonal. This would not allow a PCA to be independently run on each component and then choose the eigenvectors with the largest associated eigenvalues as the optimal set. Further combining all eigenvalues from each separation in the second PCA to choose the best eigenvectors requires orthogonal spectral components.

For the second PCA (patch directions) a data matrix of 25×468 (the 25 cells) is created (which is extracted from equation 2) for each of the three principal spectral directions, where each row is treated as an observation (the patch variation for a given spectral component). The eigenvalues and eigenvectors for this matrix are found analogous to the method of the spectral variation PCA. By way of example, for the 25 cells of profile measurement data acquired on a test color printer, an analysis of the data set for each of the 3 spectral directions resulted in the following top 5 eigenvalues (or singular values) for each of their covariance matrices:

| Spect1 | Spect2 | Spect3 |
|---|---|---|
| 3.0018 | 0.4674 | 0.1772 |
| 0.6917 | 0.1603 | 0.0311 |
| 0.2260 | 0.0577 | 0.0163 |
| 0.0876 | 0.0453 | 0.0156 |
| 0.0670 | 0.0277 | 0.0089 |

From the above set, the most significant eigenvalues must be chosen in decreasing order to optimize the data set to fit from the fewest number of components. Given the clear separations between eigenvalues, six components are chosen: 3 from the first principal spectral direction, 2 from the second and 1 from the third. These 6 directions account for about 80% of the total variation energy. Note that the remaining eigenvalues are smaller than these and do not decay quickly.

Unfortunately, the data set for this stage of the experiment is significantly smaller than the data set for the spectral PCA. In our test, there are only 25 data samples (unlike the 10,000+ for spectral) in various machine states collected. Given the smaller data set, it is difficult to conclude that this data represents the distribution of variation and that 80% of the energy can be captured in the 6 components. Also, the remaining eigenvalues are small, decay slowly and could be highly dependent on this data set, so it is not reasonable to expect that adding more components will significantly reduce the residual error energy (actual variation−modeled variation) much below 20%. A much larger data set is needed to accurately quantify going beyond the 80% fit accuracy estimated here.

Figure 2:
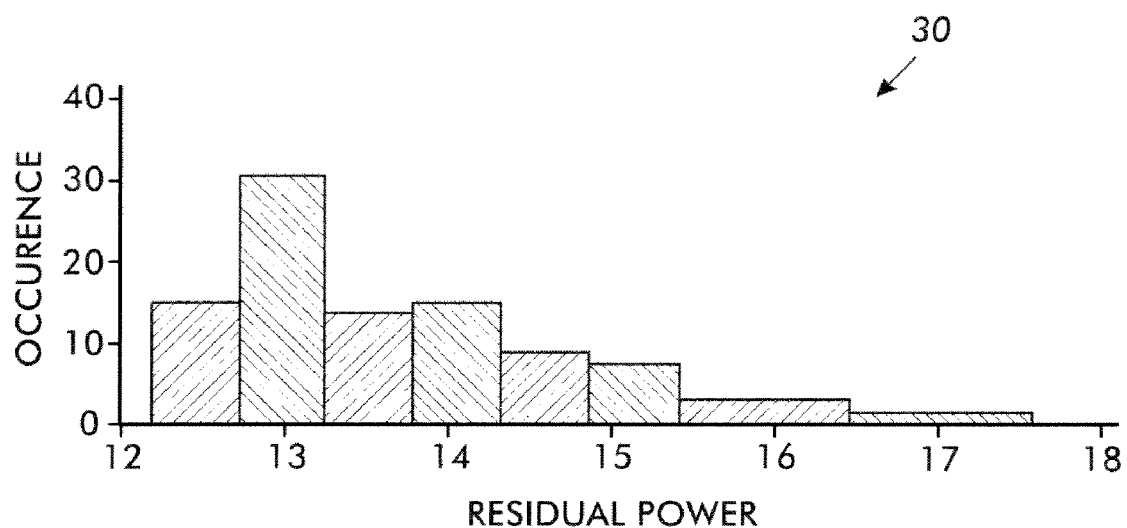
FIG. 2 is a bootstrap histogram representation of the residual power according to one aspect of this disclosure.
Figure 3:
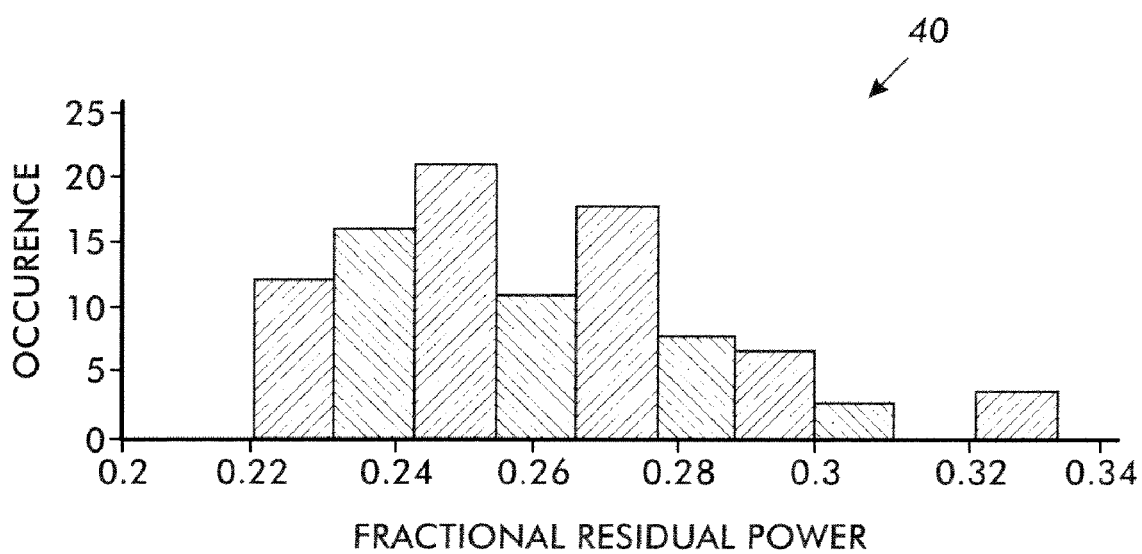
FIG. 3 is another bootstrap histogram representation of the residual power according to another aspect of this disclosure.

In order to gain confidence in this small set of data, even for the 80% energy fit, bootstrapping was used. In bootstrapping a random subset (½ in this case) of the data is used for the PCA to determine directions. The results of the PCA are applied to the rest of the data set to determine how good of a model the PCA fit is for that set. This process is repeated many times—each time a different random subset is chosen for PCA analysis and the rest of the data is fit with that PCA. If all of the data comes from one distribution the expected amount of residual energy (actual variation−modeled variation) would be insensitive to the subset chosen for analysis using PCA. FIGS. 2 and 3 illustrate graphs of the bootstrapping method for this dataset. Graph 30 illustrates residual power associated with different data sets when using the PCA model. Graph 40 illustrates fractional residual power associated with different data sets when using the PCA model. The fractional residual power is defined as follows. If fit error= (actual data)−(PCA based estimated data), then the fractional residual power=$\Sigma$(Fit error)$^2$/$\Sigma$(actual−$\mu$)$^2$, which is basically, the fit error power as a fraction of the total power. $\mu$ is the mean or average of the actual data.

In this case the residual power is unimodal, the fit error is also compact and the fractional residual power is about 0.25, near the 0.2 (or 20%) fit error the PCA estimated using all of the data. The reason that the actual mean error (0.25) is slightly larger than the PCA error (0.2) is that in the PCA using the full set the same data set is used for both analysis and fit. This always gives the best possible result and degradation is expected when the analysis and fit data sets are different.

With this data, it was shown that 20% of the energy is not captured using the PCA fit. Since this is an energy, the standard deviation of the fit error is about 0.45 (sqrt(0.2)) of the total standard deviation in the data set. Even if the model size is extended to result in only 10% fit error energy, the standard deviation of the fit error would still be about 0.3. The law of diminishing returns sets a reasonable lower limit on the PCA performance. The remaining question is whether or not this level of performance is sufficient for color calibration and profiling.

The main purpose of the PCA is to allow an estimate of the data set from a few coefficients in the field: 6 in our particular example. An estimate of the 468×31 is generated from the spectral and patch principal components/eigenvectors using:

Data set estimate=patch mean values+
$c_{11}*\beta11_{patch}*\beta1_{spectral}^T+$
$c_{12}*\beta12_{patch}*\beta1_{spectral}^T+$
$c_{13}*\beta13_{patch}*\beta1_{spectral}^T+$
$c_{21}*\beta21_{patch}*\beta2_{spectral}^T+$
$c_{22}*\beta22_{patch}*\beta2_{spectral}^T+c_{31}*\beta31_{patch}*\beta3_{spectral}^T$ (4)

Where $\beta XY_{patch}$, a vector of length 468, is the $Y^{th}$ eigenvector/principal component of the $X^{th}$ spectral component, e.g. $\beta21_{patch}$ is the $1^{st}$ eigenvector (most significant eigenvector) of the $2^{nd}$ spectral component and $\beta X_{spectral}$ is the Xth principal spectral component. The coefficient $c_{xy}$ is found from:

$$c_{xy}=\beta xy_{patch}^T*D*\beta x_{spectral} \quad (5)$$

Notably, the exact calculation of the $c_{xy}$s requires measurement of all the patches. It is desirable to estimate the 6 $c_{xy}$ from a small subset of patches to reduce the required measurement set; almost all subsets of 3 or more patches will provide an unbiased estimate of the $c_{xy}$s, but some subsets provide more accurate estimates (lower MS estimation error). From the full 468 set, it is necessary to determine a subset of patches from the set of 468 whose measurements can be used to provide an accurate estimate (small MS estimation error) of the 6 coefficients of the principal directions determined by the PCA. The subset of patches chosen to estimate the whole population should contain large amounts of each of the principal directions and should be insensitive to measurement noise.

For any subset of K patches, S (size K×31), we can form an equation that relates each of the 3 principal spectral directions for that set of patches as a function of the 6 coefficients:

$S*\beta1_{spectral}=[\beta11sub_{patch}\ \beta12sub_{patch}\ \beta12sub_{patch}]$
$[c_{11}\ c_{12}\ c_{13}]^T$ $S*\beta2_{spectral}=[\beta21sub_{patch}\ \beta22sub_{patch}]\ [c_{21}\ c_{22}]^T$ $S*\beta3_{spectral}=\beta31sub_{patch}\ c_{31}$ (6)

where $\beta xysub_{patch}$ contains the rows of $\beta xy_{patch}$ that correspond to the patches chosen in S. For example, if S contains the measurements for patches 1,3,7,8,15 and 22 (S is a 6×31 matrix), then $xysub_{patch}$ is a 6 long vector that contain the $1^{st}$, $3^{rd}$, $7^{th}$, $8^{th}$, $15^{th}$ and $22^{nd}$ rows of $\beta xy_{patch}$. These overdetermined set of equations have the known minimum mean square solution:

$[c_{11}\ c_{12}\ c_{13}]^T=(\beta1sub_{patch}^T*\beta1sub_{patch})^{-1}$
$\beta1sub_{patch}^T*S*\beta1_{spectral}$ $[c_{21}\ c_{22}]^T=(\beta2sub_{patch}^T*\beta2sub_{patch})^{-1}$
$\beta2sub_{patch}^T*S*\beta2_{spectral}$ $c_{31}=(\beta31sub_{patch}^T*\beta31sub_{patch})^{-1}$
$\beta31sub_{patch}^T*S*\beta3_{spectral}$ (7)

Where $\beta1sub_{patch}$ is the matrix $[\beta11sub_{patch}\ \beta12sub_{patch}\ \beta12sub_{patch}]$ and $\beta2sub_{patch}$ is the matrix $[\beta21sub_{patch}\ \beta22sub_{patch}]$.

Therefore, from at least 3 patches we can derive an estimate of the 6 coefficients needed for the reduced model description. The more patches that are used, the more accurate the estimate of the 6 coefficients, $c_{xy}$.

From the set of 468 patches, a subset of size 22 was determined as being adequate for estimating the 6 coefficients. Although the 6 coefficients are estimated using these 22 patch measurements, there is an estimation error due to the fact that all of the patches contain both noise and other terms that are not being modeled. The 22 patch subset is chosen to try to minimize this estimation error. For the data set obtained (25 cells) an analysis shows that with 22 patches the overall residual error will increase by about 20%, from a 0.20 fractional residual energy to a 0.24 fractional residual energy; this is due to the errors in the coefficient estimation. With the 22 patches used, the model now predicts 75% of the variation in the data, instead of the 80% theoretical limit.

A first test of the sufficiency of using PCA to model the data was completed. First, a printer correction was performed by measuring the 468 patch set. Additionally, only 33 of these patches were used to estimate the full 468 set using the PCA for data recreation. With all 468 points used, the profile generated resulted in a 95% dE error of 3.0, while with 33 patches and PCA the 95% dE error was 3.5. Profiling with less than 10% of the full data set patches, had only slight degradation when compared to profiling using the full patch set.

Overall, PCA appears to be a useful tool in printer characterization requiring a greatly reduced number of patches when compared to direct/full calibration.

To build confidence with the PCA approach to profiling, a 25 multi-cell experiment on iGen was completed for a profiling option. 33 patches were actively measured, and the spectral data was used to estimate the spectral measurements for 468 colors using this invention. Using the original 468 patch measurements, overall accuracy of profile LUTs for 928 IT8 colors is shown in the table below.

|  | Mean | 95% | Max |
| --- | --- | --- | --- |
| without PCA | 1.38 | 2.96 | 4.38 |
| with PCA | 1.75 | 3.51 | 4.73 |

Although we see about 0.5 deltaE2K difference between with and without PCA approximations, this kind of loss in color accuracy is quite tolerable for many customers particularly when it is weighed against the cost of media incurred during measurement of 468 patches instead of simply 33 patches. Particularly when inline spectral sensors are used, number of patches per page will be quite small when compared to offline measurements. Also, frequency at which the profile have to be generated is another factor that plays a big role in the cost of media.

Additionally, data can be continually collected on the principal directions of the 468 patch set. On a much rarer basis, characterization of the printer can be done using the 468 data. A fit of the 468×31 data set using the PCA vectors can signal if the PCA vectors are still accurate or no longer applicable. If the data set is not well modeled by the PCA form, that outlier patch set can be retrieved by engineering to determine time varying components of the PCA (e.g. machine aging not originally compensated for), which allows in field update of the vectors. This ensures that the PCA is not made obsolete as the machine ages.

To summarize, the method of profiling an image output device, such as a printer, disclosed hereto is as follows.

(I) Printer Data

Calibration Data
  Printer model built using patches to make a LUT
  468 Patches
  Single Color (CMYK), 3 color gray sweeps, 2 at a time patches
  Each patch captured spectrally
  31 spectral components: 400-700 nm by 10 nm increments
  Printer represented by a 468×31 matrix, P
  Data from N printers are collected (N=25)

(II) Spectral PCA

PCA data fit in the spectral dimension
  Reduce 468×31 to a smaller 468×M
  Determine Nominal Printer $P_{avg}$ from the N sample printer data
  $(P_{avg}=(\Sigma_{i=1:N}P_i)/N)$
  Subtract $P_{avg}$ from each of the printer data sets for printer variants
  $\tilde{P}_i = P_i - P_{avg}$
  Treat each variant printer as 468, 31×1 spectral vector (S) sets
  Determine key principal components
  Calculate $C_s(k,l)=E\{S(k)\ S(l)\}=(\Sigma_{i=1:234N}\ S_i(k)\ S_i(l))/(234*N)$
  Determine eigenvalues and eigenvectors of $C_s$ (31×31)
    Choose required number of principal components
    3 components represents 98% of the spectral energy (III) Spectral Mapping to Principal Components Map printer to reduce spectral set (31 to 3)
  Create a transformation matrix, T (31×3), using the 3 principal 31×1 eigenvectors, $e^s$, of $C_s$
  $T=\{e^s_1\ e^s_2\ e^s_3\}$
  Apply the transformation, T, to each of the variant printers
  $\hat{P}_i = \tilde{P}_i\ T$
  Properties of $\hat{P}_i$
  468×3 Matrix
  Spectral values mutually $\perp$ – $E\{P(i,k)\ \hat{P}(i,m)\} \hat{=} (\lambda_k\ \lambda_m)^{0.5}\delta(k-m)$
  Easily converted back to estimate $\tilde{P}_i$, $\tilde{P}_i \approx \hat{P}_i\ T'$ (IV) Patch PCA Perform a PCA in the patch direction to reduce the 468×3 to an R×1—reduce in the non-spectral direction
  Each column (spectral direction) of the 468×3 data sets, $\hat{P}_i$, are treated independently
  Do 3 independent PCA's on the 468 long vectors
  For each spectral direction we have N different 438×1 vectors
  Perform a PCA on all 3 spectral directions (each column)
  Determine and order the largest eigenvalues of the 3 sets
    $\lambda_{ik}$=the $k^{th}$ (1 to 438) eigenvalue of the $i^{th}$ (1, 2, 3) column/data set
      Determine how many eigenvalues are needed for sufficient accuracy
  More eigenvalues=higher model order=more accuracy
  3 of 702 components describe 80% of the printer variation
  Note, three components describe the printer.
  2 components from $1^{st}$ spectral direction, one from the $2^{nd}$ ($c_{11}, c_{12}, c_{21}$)
  $c_{ij}=P(1:468,i)'*e^p{}_{ij}$–$i^{th}$ column of $\hat{P}*j^{th}$ eigenvector of the $i^{th}$ spectral component
  Reconstruction/Estimation is:
  $\hat{P} \approx [c_{11}\ e^{tp}{}_{11} + c_{12}\ e^{tp}{}_{12}\ c_{21}\ e^{tp}{}_{21}\ 0]$
  Putting all together
  $P \approx [c_{11}\ e^{tp}{}_{11} + c_{12}\ e^{tp}{}_{12}\ c_{21}\ e^{tp}{}_{21}\ 0]*T' + P_{avg}$ (V) Printer Model
  Three Parameter Model
  All three parameters are uncorrelated
  Eigenvalues are the variance of the coefficients
  MVG assumption results in independence of parameters/pdf
  Monte Carlo analysis
  System Model of 3 parameters, each $N(0,\lambda_{ij})$ With reference to FIGS. 4A, 4B and 5, illustrated are exemplary flow charts which further describe a 2D PCA based color control system as disclosed.

Figure 4A:
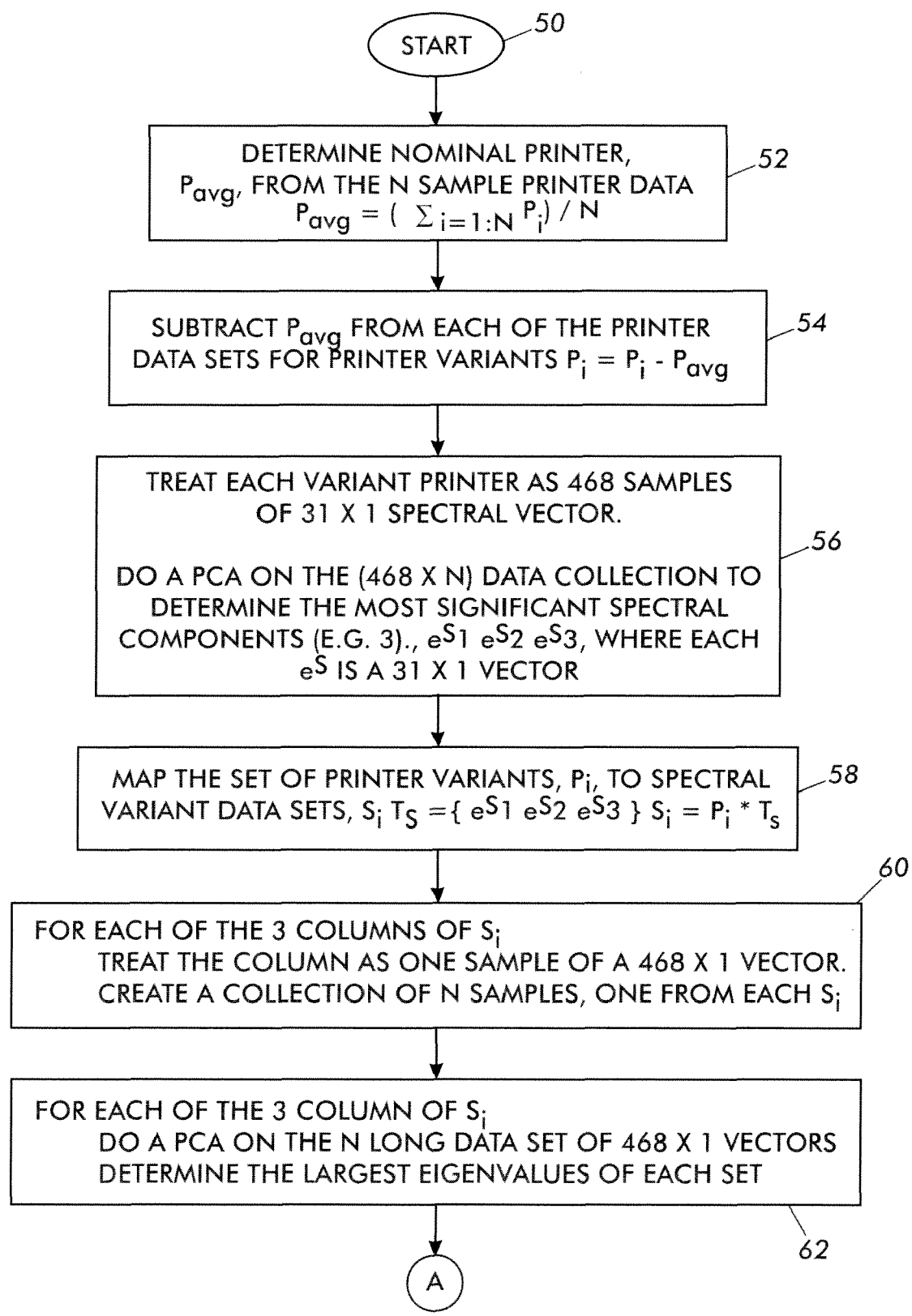
FIGS. 4A and 4B are flow charts illustrating an off-line portion of an exemplary method of controlling an image output device according to this disclosure.
Figure 4B:
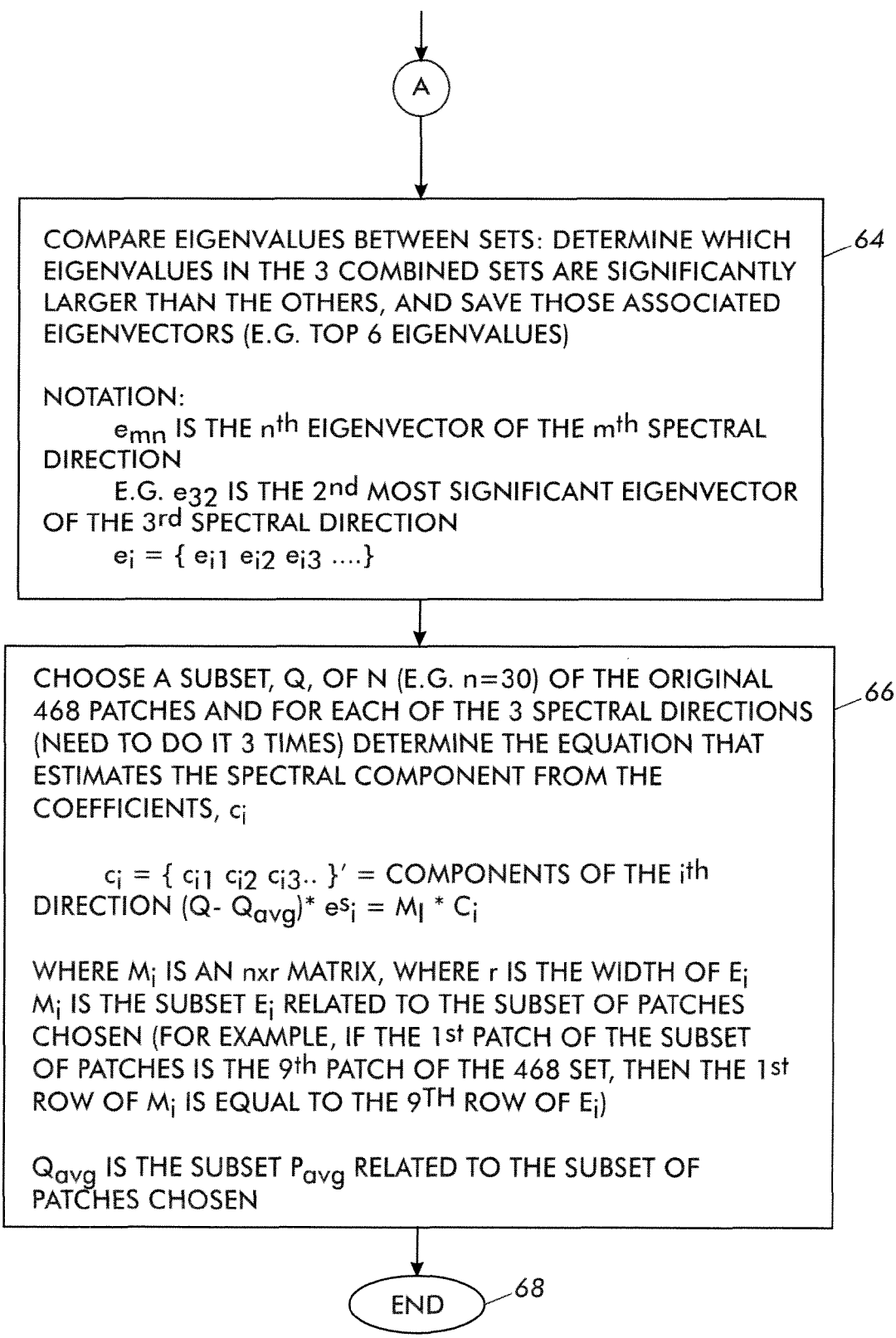

FIGS. 4A and 4B details the processes for determining the 2D PCA components based on a plurality of printing machine states and/or a plurality of substantially equivalent printers.

Figure 5:
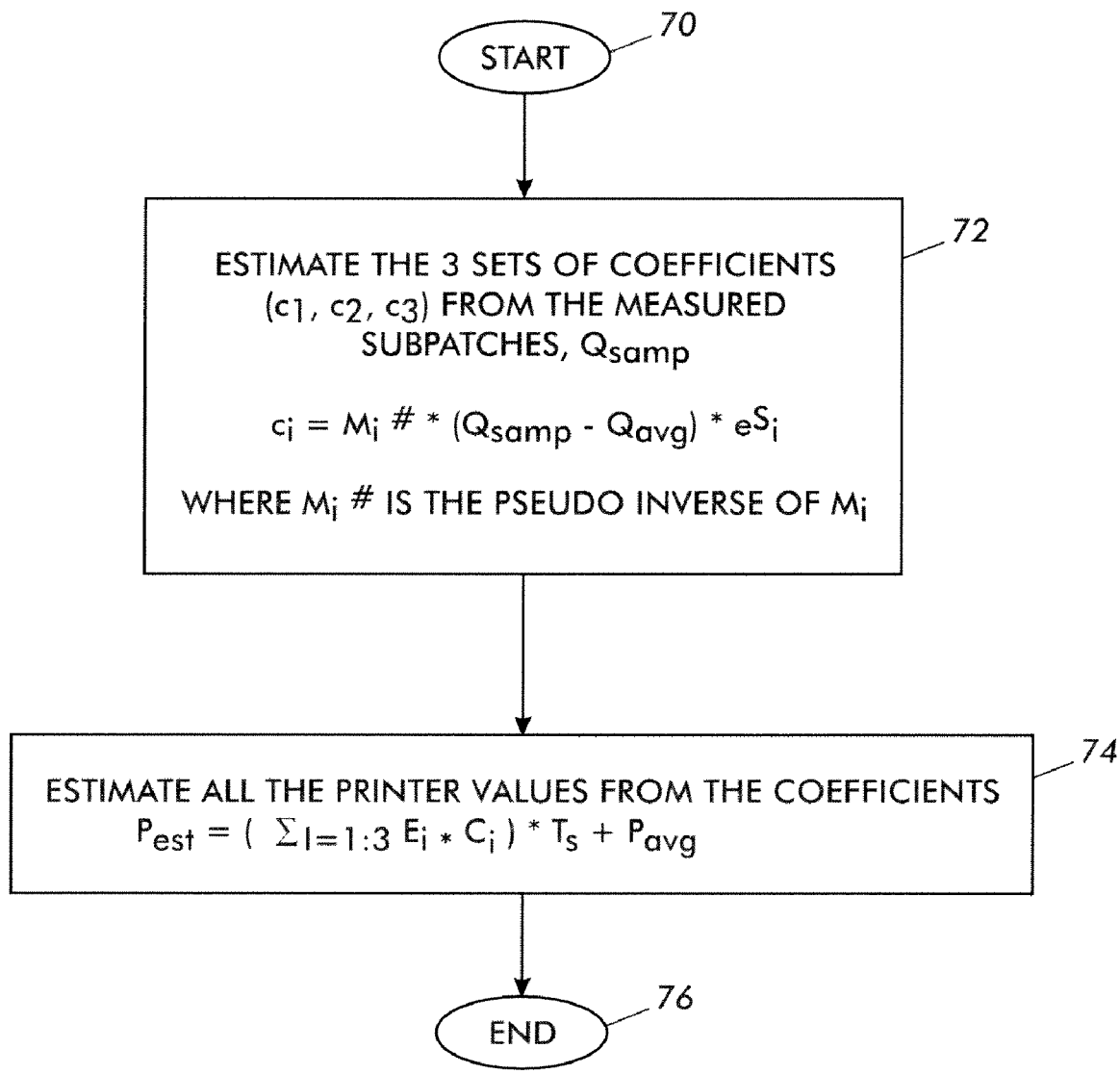
FIG. 5 is a flow chart illustrating an on-line portion of an exemplary method of controlling an image output device according to this disclosure.

FIG. 5 details the processes for updating a printer profile using data from a series of patches and the PCA components acquired by the algorithms illustrated in FIGS. 4A and 4B.

With continuing reference to FIGS. 4A and 4B, initially the 2D PCA process starts 50 by the execution of the process.

Next 52, the process determines Nominal Printer, $P_{avg}$, from the N sample printer data $P_{avg}=(\Sigma_{i=1:N}P_i)/N$ Next 54, the process subtracts $P_{avg}$ from each of the printer data sets for printer variants $P_i=P_i-P_{avg}$ Next 56, the process treats each variant printer as 468 samples of 31×1 spectral vector, and does a PCA on the (468×N) data collection to determine the most significant spectral components (e.g. 3), $e^s_1$ $e^s_2$ $e^s_3$, where each $e^s$ is a 31×1 vector.

Next 58, the process maps the set of printer variants, $P_i$, to spectral variant data sets, $S_i$, where $T_s=\{e^s_1\ e^s_2\ e^s_3\}$ $S_i=P_i*T_s$.

Next 60, for each of the 3 columns of $S_i$, the process treats the column as one sample of a 468×1 vector, and creates a collection of N samples, one from each $S_i$.

Next 62, for each of the 3 column of $S_i$, the process does a PCA on the N long data set of 468×1 vectors, and determines the largest eigenvalues of each set.

Next 64, the process compares eigenvalues between sets: determine which eigenvalues in the 3 combined sets are significantly larger than the others, and save those associated eigenvectors (e.g. top 6 eigenvalues)

Notation:
$e_{mn}$ is the $n^{th}$ eigenvector of the $m^{th}$ spectral direction
e.g. $e_{32}$ is the $2^{nd}$ most significant eigenvector of the $3^{rd}$ spectral direction
$E_i=\{e_{i1}\ e_{i2}\ e_{i3}\ \ldots\}$ Next 66, the process chooses a subset, Q, of n (e.g. n=30) of the original 468 patches and for each of the 3 spectral directions (need to do it 3 times) determines the equation that estimates the spectral component from the coefficients, $c_i$, where $c_i=\{c_{i1}\ c_{i2}\ c_{i3}\ \ldots\}'$=components of the $i^{th}$ direction $(Q-Q_{avg})*e^s_i=M_i*c_i$ Where $M_i$ is an n×r matrix, where r is the width of $E_i$ $M_i$ is the subset $E_i$ related to the subset of patches chosen (for example, if the $1^{st}$ patch of the subset of patches is the $9^{th}$ patch of the 468 set, then the $1^{st}$ row of $M_i$ is equal to the $9^{th}$ row of $E_i$)

$Q_{avg}$ is the subset $P_{avg}$ related to the subset of patches chosen

With reference to FIG. 5, the perform the on-line estimate of the printer profile from sample measurements, the process initially starts 70 and the 72 estimates the 3 sets of coefficients ($c_1, c_2, c_3$) from the measured subpatches, $Q_{samp}$, where $c_i=M_i^{\#}*(Q_{samp}-Q_{avg})*e^s_i$, and where $M_i^{\#}$ is the pseudo inverse of $M_i$.

Next 74, the process estimates all the printer values from the coefficients, where $P_{est}=(\Sigma_{i=1:3}E_i \cdot c_i)*T_s'+P_{avg}$.

Finally, the process ends 76 after all the printer values are estimated in step 74.

At this point, the off-line portion of the process ends 68.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling an image output device operatively connected to a spectral measurement device and one or more controllers, the controller performing the method comprising the steps of:

(a) generating an initial image output device LUT (look-up-table) characterizing an image output device for a plurality of states associated with the image output device, wherein each state of the image output device LUT associates a first set of target colors with a plurality of respective spectral measurements;

(b) generating a first data matrix representing all spectral measurements associated with each respective target color for all image output device states;

(c) calculating the nominal spectral response associated with each target color;

(d) generating a second data matrix representing the target color spectral variation by subtracting the nominal spectral response from each target color spectral response for each state;

(e) performing a first PCA (Principle Component Analysis) on the second data matrix to represent the image output device LUT with a third data matrix including the first set of target colors associated with a predetermined number of spectral directions;

(f) performing a second PCA on each spectral direction associated with the third data matrix to represent the image output device LUT with a fourth data matrix including each principle spectral direction associated with the variation of the first set of target colors;

(g) measuring the spectral properties associated with a second set of target colors, the second set of target colors including a subset first set of target colors; and (h) estimating an image output device LUT for the first set of target colors utilizing the third and fourth data matrixes, and the measured spectral properties associated with the second set of target colors.

2. The method for controlling an image output device according to claim 1, wherein the first data matrix is represented as D, and the first PCA generates eigenvalues and eigenvectors of $D^T D/(M*N)$, where M equals the number of colors in the first set of target colors and N equals the number of states, and $D^T$ represents the transpose of matrix D.

3. The method for controlling an image output device according to claim 2, wherein M is greater than or equal to 100 and N is greater than or equal to 8.

4. The method for controlling an image output device according to claim 1, wherein the initial image output device LUT is a multi-dimensional profile LUT and step (h) estimates a multi-dimensional image output device profile LUT.

5. The method for controlling an image output device according to claim 1, wherein the initial image output device profile is a single dimensional LUT and step (h) estimates a single dimensional image output device profile LUT.

6. The method for controlling an image output device according to claim 2, wherein the third data matrix ($D_3$) is calculated according to $D_3=D\ \beta r$, where $\beta_r=[\beta_1\ \beta_2\ \beta_3]$, where $\lambda$=eigenvalues of $D^T D/(M*N)$, $\lambda_i$ represents the $i^{th}$ largest eigenvalue of $D^T D$, $\beta$=the eigenvectors of $D^T D/(M*N)$, and $\beta_1$ represents the eigenvector associated with $\lambda_i$.

7. The method for controlling an image output device according to claim 6, wherein the fourth data matrix Data set estimate=patch mean values+$c_{11}*\beta 11_{patch}*\beta 1_{spectral}^T+c_{12}*\beta 12_{patch}*\beta 1_{spectral}^T+c_{13}*\beta 13_{patch}*\beta 1_{spectral}^T+c_{21}*\beta 21_{patch}*\beta 2_{spectral}^T+c_{22}*\beta 22_{patch}*\beta 2_{spectral}^T+c_{31}*\beta 31_{patch}*\beta 3_{spectral}^T$, where $\beta XY_{patch}$ is the $Y^{th}$ eigenvector/principal component of the $X^{th}$ spectral component and $c_{xy}=\beta xy_{patch}^T * D * \beta x_{spectral}$.

8. An image output device color control system comprising:
   an image output device comprising an input configured to receive image data for display or printing by the image output device;
   a spectral measurement device; and
   a controller operatively connected to the image output device and spectral measurement device, the controller configured to receive CMYK or RGB data and convert to image output device independent image input data and map the device independent input data to image output device dependent input data for display or printing by the image output device, wherein the controller comprises a controller-usable data carrier storing instructions that, when executed by the controller cause the controller to perform a method comprising:
   (a) generating an initial image output device LUT (look-up-table) characterizing an image output device for a plurality of states associated with the image output device, wherein each state of the image output device LUT associates a first set of target colors with a plurality of respective spectral measurements;
   (b) generating a first data matrix representing all spectral measurements associated with each respective target color for all image output device states;
   (c) calculating the nominal spectral response associated with each target color;
   (d) generating a second data matrix representing the target color spectral variation by subtracting the nominal spectral response from each target color spectral response for each state;
   (e) performing a first PCA (Principle Component Analysis) on the second data matrix to represent the image output device LUT with a third data matrix including the first set of target colors associated with a predetermined number of spectral directions;
   (f) performing a second PCA on each spectral direction associated with the third data matrix to represent the image output device LUT with a fourth data matrix including each principle spectral direction associated with the variation of the first set of target colors;
   (g) measuring the spectral properties associated with a second set of target colors, the second set of target colors including a subset first set of target colors; and
   (h) estimating an image output device LUT for the first set of target colors utilizing the third and fourth data matrixes, and the measured spectral properties associated with the second set of target colors.

9. The image output device color control system according to claim 8, wherein the first data matrix is represented as D, and the first PCA generates eigenvalues and eigenvectors of $D^T D/(M*N)$, where M equals the number of colors in the first set of target colors and N equals the number of states, and $D^T$ represents the transpose of matrix D.

10. The image output device color control system according to claim 9, wherein M is greater than or equal to 100 and N is greater than or equal to 8.

11. The image output device color control system according to claim 8, wherein the initial image output device LUT is a multi-dimensional profile LUT and step (h) estimates a multi-dimensional image output device profile LUT.

12. The image output device color control system according to claim 8, wherein the initial image output device profile is a single dimensional LUT and step (h) estimates a single dimensional image output device profile LUT.

13. The image output device color control system according to claim 9, wherein the third data matrix ($D_3$) is calculated according to $D_3 = D \beta r$, where $\beta_r = [\beta_1 \ \beta_2 \ \beta_3]$, where $\lambda$=eigenvalues of $D^T D/(M*N)$, $\lambda_i$ represents the $i^{th}$ largest eigenvalue of $D^T D$, $\beta$=the eigenvectors of $D^T D/(M*N)$, and $\beta_i$ represents the eigenvector associated with $\lambda_i$.

14. The image output device color control system according to claim 13, wherein the fourth data matrix Data set estimate=patch mean values+$c_{11}*\beta 11_{patch}*\beta 1_{spectral}^T+c_{12}*\beta 12_{patch}*\beta 1_{spectral}^T+c_{13}*\beta 13_{patch}*\beta 1_{spectral}^T+c_{21}*\beta 21_{patch}*\beta 2_{spectral}^T+c_{22}*\beta 22_{patch}*\beta 2_{spectral}^T+c_{31}*\beta 31_{patch}*\beta 3_{spectral}^T$, where $\beta XY_{patch}$ is the $Y^{th}$ eigenvector/principal component of the $X^{th}$ spectral component and $c_{xy}=\beta xy_{patch}^T*D*\beta x_{spectral}$.

15. The image output device color control system according to claim 8, wherein the spectral measurement device is operatively connected in line with the image output device.

16. The image output device color control system according to claim 8, wherein the target color sets comprise a number of colors selected using a low rank approximation algorithm.

17. The image output device color control system according to claim 8, wherein the image output device dependent color space representations comprise one or more GCR (Gray Component Replacement) and UCR (Under Color Removal) sets of image output device dependent color space representations.

18. A xerographic imaging system comprising:
   an image marking device;
   an in-line spectral measurement device operatively connected to the image marking device; and
   a controller operatively connected to the image marking device and spectral measurement device, the controller configured to receive CMYK or RGB data and convert to image output device independent image input data and map the device independent input data to image output device dependent input data for display or printing by the image output device, wherein the controller comprises a controller-usable data carrier storing instructions that, when executed by the controller cause the controller to perform a method comprising:
   (a) generating an initial image output device profile LUT (look-up-table) characterizing the color profile of the image output device for a plurality of states associated with the image output device, wherein each state of the image output device LUT associates a first set of target colors with a plurality of respective spectral measurements;
   (b) generating a first data matrix representing all spectral measurements associated with each respective target color for all image output device states;
   (c) calculating the nominal spectral response associated with each target color;
   (d) generating a second data matrix representing the target color spectral variation by subtracting the nominal spectral response from each target color spectral response for each state;
   (e) performing a first PCA (Principle Component Analysis) on the second data matrix to represent the image output device profile LUT with a third data matrix including the first set of target colors associated with a predetermined number of spectral directions;
   (f) performing a second PCA on each spectral direction associated with the third data matrix to represent the image output device profile LUT with a fourth data matrix including each principle spectral direction associated with the variation of the first set of target colors;

(g) measuring the spectral properties associated with a second set of target colors, the second set of target colors including a subset first set of target colors; and (h) estimating an image output device profile LUT for the first set of target colors utilizing the third and fourth data matrixes, and the measured spectral properties associated with the second set of target colors.

19. The xerographic imaging system according to claim 18, wherein the first data matrix is represented as D, and the first PCA generates eigenvalues and eigenvectors of $D^T D/(M*N)$, where M equals the number of colors in the first set of target colors and N equals the number of states, and $D^T$ represents the transpose of matrix D.

20. The xerographic imaging system according to claim 19, wherein M is greater than or equal to 100 and N is greater than or equal to 8.

* * * * *